US006278753B1

United States Patent
Suarez et al.

(10) Patent No.: US 6,278,753 B1
(45) Date of Patent: Aug. 21, 2001

(54) METHOD AND APPARATUS OF CREATING AND IMPLEMENTING WAVELET FILTERS IN A DIGITAL SYSTEM

(75) Inventors: Jose I. Suarez, Coral Gables; Yolanda Prieto, Miami; Yolanda M. Pirez, Davie, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/304,313

(22) Filed: May 3, 1999

(51) Int. Cl.$^7$ .................................................. H04B 1/10
(52) U.S. Cl. ............................................ 375/350; 708/300
(58) Field of Search .................................. 375/254, 285, 375/296, 346, 349, 350, 377; 382/248; 708/300, 819, 520; 370/203; 702/190, 196, 197

(56) References Cited

U.S. PATENT DOCUMENTS

| | | | |
|---|---|---|---|
| 5,802,481 | 9/1998 | Prieto | 702/190 |
| 5,943,642 | * 8/1999 | Choi | 702/197 |
| 5,999,656 | * 12/1999 | Zandi et al. | 382/248 |

OTHER PUBLICATIONS

Daubechies I. and Sweldens, W., "Factoring Wavelet Transforms into Lifting Steps," J. Fourier Anal. Appl., vol. 4, No. 3, pp. 245–267, 1998.

* cited by examiner

*Primary Examiner*—Chi Pham
*Assistant Examiner*—Jean B Corrielus
(74) *Attorney, Agent, or Firm*—Barbara R. Doutre; Frank M. Scutch, III

(57) ABSTRACT

A method for generating a wavelet filter provides improved selectivity with minimal computational intensity in digital data systems (300,400). The process begins by generating an initial wavelet formed of low pass and high pass analysis filter bank (302). The next steps include obtaining an upper triangular matrix which, when multiplied by the initial wavelet, produces a product retaining the symmetry and enhancing the number of zero moment(s) of the initial wavelet (304); and obtaining a lower triangular matrix which, when multiplied by the initial wavelet, produces a product retaining the symmetry and the zero moment of the initial wavelet (306). By multiplying the upper and lower triangular matrices with the initial wavelet, an updated wavelet filter with improved selectivity is produced (308, 318).

18 Claims, 8 Drawing Sheets

METHOD AND APPARATUS OF CREATING AND IMPLEMENTING WAVELET FILTERS IN A DIGITAL SYSTEM

CROSS REFERENCE TO RELATED APPLICATIONS

This application is related to U.S. application Ser. No. 09/221,434 filed Dec. 28, 1998, by Prieto et al., entitled "Method and Apparatus for Implementing Wavelet Filters in a Digital System," and assigned to Motorola, Inc.

TECHNICAL FIELD

This invention relates in general to data spectral analysis and particularly to digital data filtering. Specifically, the invention relates to a method and apparatus that provides improved wavelet filter operation for digital data systems.

BACKGROUND

With the advent of technologies and services related to teleconferencing and digital image storage, considerable progress has been made in the field of digital signal processing. As will be appreciated by those skilled in the art, digital signal processing typically relates to systems, devices, and methodologies for generating a sampled data signal, compressing the signal for storage and/or transmission, and thereafter reconstructing the original data from the compressed signal. Critical to any highly efficient, cost effective digital signal processing system is the methodology used for achieving compression.

Methodologies capable of minimizing the amount of information necessary to represent and recover an original data are desirable, as well as those with lowest computational complexity and cost. In addition to cost, simplicity of hardware and software implementations capable of providing high quality data reproduction with minimal delay are likewise desirable.

To present, the next standard of JPEG 2000 (Joint Photographic Experts Group) systems for still images proposes algorithms, which use a wavelet to achieve spectral decomposition of an input signal. In systems utilizing a wavelet, the data is typically divided through low pass and high pass filters. The implementation of wavelet filters is typically achieved using a filter bank, and in many instances involves several levels of filtering preceded by decimation of the previous level results. Filter bank operation is often implemented through numerous multiplications and additions between the wavelet coefficients and the input data.

The typical wavelet is implemented as a full length filter. The disadvantage to the full length filter approach is that if a different wavelet is sought to be used for processing the various subband levels, an entirely new wavelet must be created. This may increase the number of operations, thereby increasing complexity, reducing efficiency, and lowering flexibility.

FIG. 1, is a block diagram of a prior art two-channel, single-level, digital data filter bank system 100. Multi-level, multi-channel systems also exist in the art. System 100 includes an encoder path 102 and a decoder path 104. The encoder path 102 includes an analysis bank 106 consisting of two complementary filters, a low pass-like filter $H_0(z)$ 108, and a high pass-like filter, $H_1(z)$, 110. The decoder path 104 includes a synthesis filter bank 112 consisting of a low pass-like filter $G_0(z)$ 114 and a high pass-like filter $G_1(z)$ 116. All filters are assumed to be causal, that is, the filters are dependent only on past or present samples and not on future samples. The filter banks 106, 112 exhibit signal processing delay which can be canceled out.

Any discrete wavelet transform used in two-channel sub-band filtering systems can be decomposed into a finite sequence of filtering steps denoted as cascades. The decomposition corresponds to a factorization of the polyphase matrix of the wavelet or sub-band filter into elementary matrices. These elementary matrices are formed as lower or upper triangular matrices, which have diagonal entries equal to a delay. Any matrix with polynomial entries can be decomposed (i.e. factored) into elementary matrices. Examples of this process are described in an article by Danbechies, I. and Sweldens, W., entitled "Factoring Wavelet Transforms into shifting Steps," J. Fourier Anal. Appl., Vol. 4, No. 3, pp. 245–267, 1998, which is incorporated herein by reference.

FIG. 2 is a block diagram of a two-channel filter bank 200 whose analysis and synthesis filters are represented in polyphase form. An analysis filter bank 202 is represented by a valid polyphase polynomial matrix $H(z)$ having a determinant equal to a monomial in the variable "z", the algebraic equivalent of the delay operator, namely det $[H(z)]=cz^n$, with an "n" integer and a "c" constant (ideally unity). The analysis filter bank 202 receives even-odd input data samples 206 separated by a unit delay 210 and generates low pass sub-band and high pass sub-band outputs 208. Based on the conditions set for the analysis filter bank 202, the synthesis filters 204 are represented by the inverse filter bank having a polyphase matrix $G(z)$ equal to the adjoint of matrix $H(z)$, that is adj $[H(z)]$. The output of the synthesis filter 204 generates polyphase outputs 212 separated by another delay 214, and which are recombined to obtain the original signal. FIG. 2 describes a lossless system; in other words, one not involving processing such as quantization, coding, error correction, or channel transmission loss.

The adjoint of matrix $H(z)$, that is adj $[H(z)]$, provides the condition to meet perfect reconstruction capability. It is well known that the inverse of a matrix is the adjoint of that matrix divided by its determinant. For example, if $x(z)$, $y(z)$, $q(z)$, and $p(z)$ are polynomials in "z", the general polyphase matrices for the analysis and synthesis $$H(z) = \begin{bmatrix} x(z) & y(z) \\ -q(z) & p(z) \end{bmatrix} = \begin{bmatrix} H_0(z) \\ H_1(z) \end{bmatrix} \quad (1)$$

$$G(z) = \begin{bmatrix} p(z) & -y(z) \\ q(z) & x(z) \end{bmatrix} = [G_0(z) \; G_1(z)]$$

filters for a two-channel case are:
with the polynomials meeting:

$$x(z)p(z)+y(z)q(z)=Z^n. \quad (2)$$

This last equation may be referred to as the Bezout identity, forcing the determinant of the $H(z)$ matrix to be a delay. Thus, $G(z)H(z)$ will also be a delay ensuring perfect reconstruction of the input assuming no quantization (image compression) and lossless channel. From here, the analysis and synthesis filters can be related as:

$$G_0(z)=-H_1(-z) \text{ and } G_1(z)=H_0(-z). \quad (3)$$

Hence, the following zero moments are obtained:

$$G_0(-1)=-H_1(1)=0 \text{ and } G_1(1)=H_0(-1)=0. \quad (4)$$

The matrices of equation (1) can be interchanged. Thus, the dual of equation (1) is the matrix pair:

$$H_d(z) = \begin{bmatrix} q(z) & p(z) \\ -x(z) & y(z) \end{bmatrix} = \begin{bmatrix} H_0^d(z) \\ H_1^d(z) \end{bmatrix} \quad (5)$$

$$G_d(z) = \begin{bmatrix} y(z) & -p(z) \\ x(z) & q(z) \end{bmatrix} = [G_0^d(z) \; G_1^d(z)]$$

which interchanges the analysis with the synthesis filters in the following way:

$$H_0d(Z) = G_0(z).$$

$$H_1d(Z) = -G_1(z) \quad (6)$$

For the most general case of bi-orthogonal filter banks which have the above properties, the interchange of the filters produces visible effects in the presence of quantization because of the different behavior (in time and frequency domains) of the two available low-pass filters which act as interpolators. This is more evident for some filter pairs where the filters are substantially different, such as the 2/6 pair where 2 represents the length of the low pass filter and 6 represents the length of the high pass filter. There are also differences in measured peak signal-to-noise ratio, even for similar pairs, such as the 7/9 pair(and its dual, the 9/7 pair).

There is a need for a method and apparatus, which provide improved wavelet filtering. A system having the flexibility to generate multiplierless filters without having to create an entirely new filter for each wavelet level would be highly desirable. Such wavelets would minimize computational intensity and improve system programming.

DETAILED DESCRIPTION OF THE PREFERRED EMBODIMENT

Figure 1:
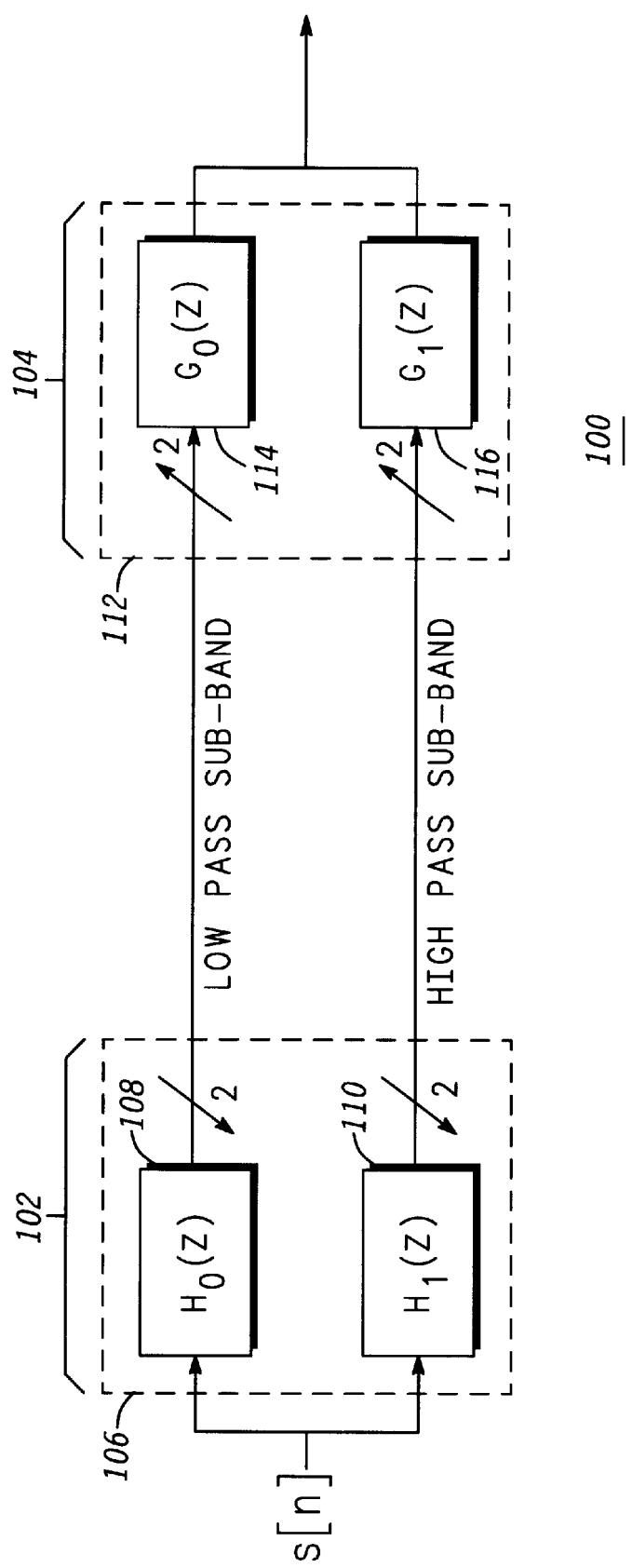
FIG. 1 is a block diagram of a prior art two-channel, one-level, digital data filter bank system 100.

While the specification concludes with claims defining the features of the invention that are regarded as novel, it is believed that the invention will be better understood from a consideration of the following description in conjunction with the drawing figures, in which like reference numerals are carried forward.

The invention to be described herein allows the creation of longer multiplierless filter pairs as a cascade (sequence) of short filters by multiplying upper and/or lower triangular matrices to the basic wavelet filter in the polyphase form. The result is a wavelet filter cascade that includes coefficients of +/− 1 divided by some powers-of-two integer which allow filtering of data by simply performing the operations of shifting and addition. The advantage of having the filter pair as a cascade is that more cascades can be added to generate new and more selective wavelets without having to implement an entirely new wavelet from the start. The goal is to reduce the number of operations and to have the flexibility to generate better filters by adding few operations to the previous filter pair. At the same time, the key properties of the shorter filter are retained and improved. Simpler coding/programming is another benefit realized.

For those applications where different wavelet lengths are desirable, the multiplierless integer wavelet coefficients of the previous filter level are used as a basic initial wavelet to generate longer filter pairs. This approach reduces the amount of programming code. The process described in this invention allows for simple programming and selection of different filter pairs.

Filter bank and discrete wavelet systems that impose perfect reconstruction constraints between the analysis and synthesis filters yield polynomial matrices whose determinant are constants or pure delays. It is during the design process of the wavelet or sub-band filters that, in accordance with the present invention, restrictions are imposed on the construction of longer wavelets starting from simple upper, $U(z)$, and lower, $L(z)$, triangular matrices whose diagonals are either unity (constant) or delay(s).

In accordance with a first embodiment of the invention, upper and lower triangular matrix multiplication in which the main diagonals involve only delays can be used to improve the selectivity of an initial singular polyphase filter, $Hi(z)$ of the form:

$$Hi(z) = \begin{bmatrix} x(z) & y(z) \\ -q(z) & p(z) \end{bmatrix} = \begin{bmatrix} H_0(z) \\ H_1(z) \end{bmatrix} \quad (7)$$

where x, y, q, and p are polynomials in z and det $[Hi(z)] = cz^n$, where c=constant (preferably 1) and n is an integer.

Figure 3:
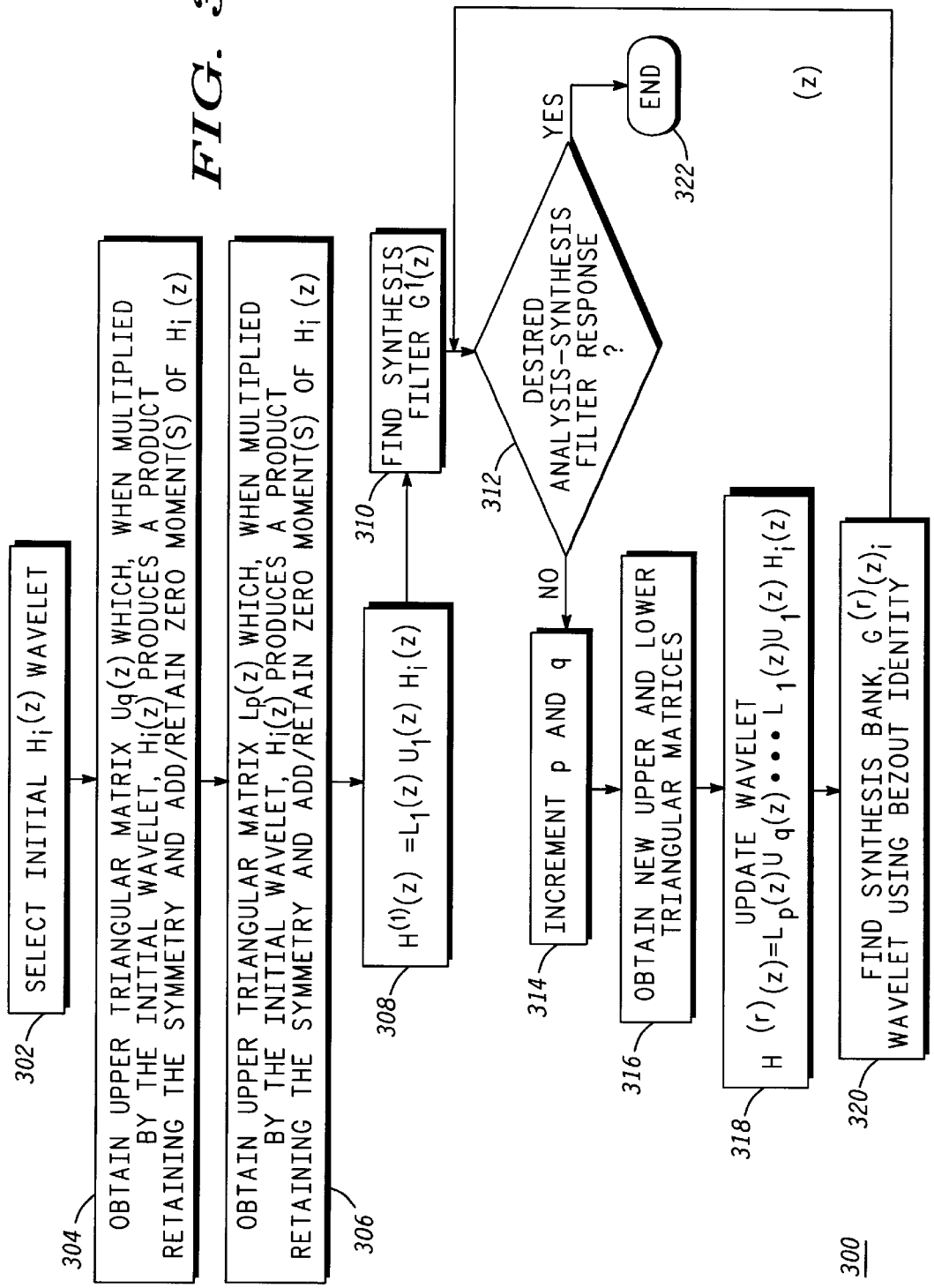
FIG. 3 is a flow chart representing a method of a wavelet filter generation technique in accordance with the present invention.

Referring to FIG. 3, there is shown a flowchart 300 of such a technique. The first step 302 begins by selecting an initial wavelet, $Hi(z)$, formed of a low pass analysis filter bank $H_{0i}(z)$ and a high pass analysis filter bank, $H_{1i}(z)$. Zero moment(s) and symmetry characterize this initial polyphase wavelet. In step 304 an upper triangular matrix $U_q(z)$ is obtained, which, when multiplied by the initial wavelet, $Hi(z)$, produces a product retaining the symmetry and possibly increasing the number of zero moments of the initial wavelet. The general form of the upper triangular matrix is:

$$U_q(z) = \begin{bmatrix} z^k & b_q(z) \\ 0 & 1 \end{bmatrix} \quad (8)$$

q=1,2,3, . . . , $N_q$, where $N_q$ is the maximum number of matrices, $U_q(z)$. Thus, equation (9) provides:

$$H^{(r)}(z) = [U_q(z)][Hi(z)] = \begin{bmatrix} z^k & b_q(z) \\ 0 & 1 \end{bmatrix} \begin{bmatrix} x(z) & y(z) \\ -q(z) & p(z) \end{bmatrix} \quad (9)$$

where q=1 for the first $U_1Hi(z)$ product and so on.

This upper triangular matrix $b_q(z)$ is selected such that the low-pass filter has zeroes on the z-plane located at z=−1. For example, $b_q(z)$ can be of the form $b_q(Z) \; b'_q(z)$, where $b'_q(z)$ is a constant or another polynomial characterized by $b'_q(1) \neq 0$, in particular the binomial $(1+z)\beta$, with the constant $\beta$ being a specific value for more zero moments. In general b(z) must be such that filter symmetry is retained.

Similarly in step 306 a lower triangular matrix, $L_p(z)$, is obtained, which, when multiplied by the initial wavelet, $Hi(z)$, produces a product retaining the symmetry and possibly increasing the number of zero moments of the initial polyphase wavelet. The general form of the lower triangular matrix, $L_P(z)$, can be of the form $$L_p(z) = \begin{bmatrix} 1 & 0 \\ a_p(z) & z^k \end{bmatrix}$$

where p=1, 2, 3, . . . Np and Np is the maximum number of $L_P(z)$ terms used to find the final wavelet.

For this lower triangular matrix $a_p(z)$ is selected such that the high pass filter has zeros on the z-plane located at z=+1. For example, $a_p(z)$ can be of the form $a_p(z)=(1-z)^m$ $a_p'(z)$, where $a_p'(z)$ is a constant or another polynomial characterized by $a_p'(1) \neq 0$. In general, a(z) must be such that filter symmetry is retained.

Thus, equation 11:

$$H^r(z) = [L_P(Z)][Hi(z)] = \begin{bmatrix} 1 & 0 \\ a_p(z) & z^k \end{bmatrix} \begin{bmatrix} x(z) & y(z) \\ -q(z) & p(z) \end{bmatrix} \quad (11)$$

where p=1 for the first Li(z) Hi(z) product and so on.

Next, an updated wavelet is produced at step 308. This updated wavelet is achieved by multiplying the lower and upper triangular matrices with the initial wavelet. Alternatively, the updated wavelet can also be achieved by multiplying the lower and upper triangular matrices with the initial wavelet. In other words, U(z)L(z) multiplication with the initial wavelet will produce a different resulting wavelet.

From equation (9), a new low-pass filter, whose value is zero at z=-1, is obtained. That is, $H_0^{(r)}(z)$ is of the general form, where (r) represents the maximum of U q(z) or $L_P(z)$ terms (i.e. r=maximum p or q. Thus, $H_0^{(1)}(z) = z^{2k}H_{0i}(z) + b_1(z^2)H_{1i}(z)$, for q=1 and r=1.

From equation (11), a new high pass filter, which is a function of the initial low pass analysis filter Hi(z), and the polynomial to be found $a_1(z)$. Thus, $H_1^{(q)}(z)$ is the form $H_1^{(1)}(z) = Z^2 H_{1i}(z) + a_1(z^2) H_{0i}$, p=1 from which it follows that a(1)=b(1)=0. Therefore, polynomials $a_1(z)$ and $b_1(z)$ must have a factor $(1-z)^n$ where n is an integer in order to retain the zero moment property. In particular, n equals the number of zero moments in the initial filter, Hi(z).

In general, $b_q(z) = (1-z)^n b'_q(z)$ and $a_p(z) = (1-z)^m a'_p(z)$, where n and m are integers and $a'_p(z)$ and $b^{1'+sc\ q}(z)$ can either be a constant or polynomials meeting $a'_p(1) \neq 0$ and $b'_q(z) \neq 0$, respectively.

Once the $a'_p(z)$ and $b'_q(z)$ polynomials are properly selected the new wavelet $H^{(1)}(z) = L_1(z) U_1(z) H_i(z)$ is obtained, after the first cascade, with p=q=1, at step 308. In general, the final wavelet, H(z), may consist of several cascades; that is, the product of several upper and lower triangular matrices in which $a_q(z)$ and $b_q(z)$ may differ from one cascade to the next.

$H(z) = L_{Np}(z) U_{Nq}(z) L_{Np-1}(z) U_{Nq-1}(z) \ldots L_1(z) U_1(z) H_i(z)$ A new wavelet is obtained after the first cascade (1) (the first product of lower and upper triangular matrices, $L_1(z) U_1(z)$, is applied to the initial wavelet Hi(z) to yield $H^{(1)}(z)$ in step 308. The corresponding synthesis wavelet filter is obtained in step 310 and performance of the analysis and synthesis filters are tested in step 312 for desired selectivity, filter length and response, computational intensity, coefficient representation as possible criteria. If the criteria is/are met, the design is complete at step 322, otherwise the indices p and q are incremented at step 314, to reflect the next pair of triangular matrices product required to generate a new wavelet filter. Again, $b_q(z)$ and $a_p(z)$ are selected and new upper and lower triangular matrices $U_q(z)$ and $L_P(z)$ respectively, are obtained at step 316. The updated triangular matrices are multiplied with the previous triangular matrices and the initial (original) wavelet to obtain the updated wavelet at step 318.

Next, the corresponding synthesis wavelet filter $G^{(r)}(z)$ is determined from the adjoint of $H^{(r)}(z)$ at step 320. Once again, step 312 is used to determine if the response of the newest generated analysis and synthesis wavelet filters meet the desired criteria for selectivity, filter length, and response, computational intensity and coefficient representation.

Figure 4A:
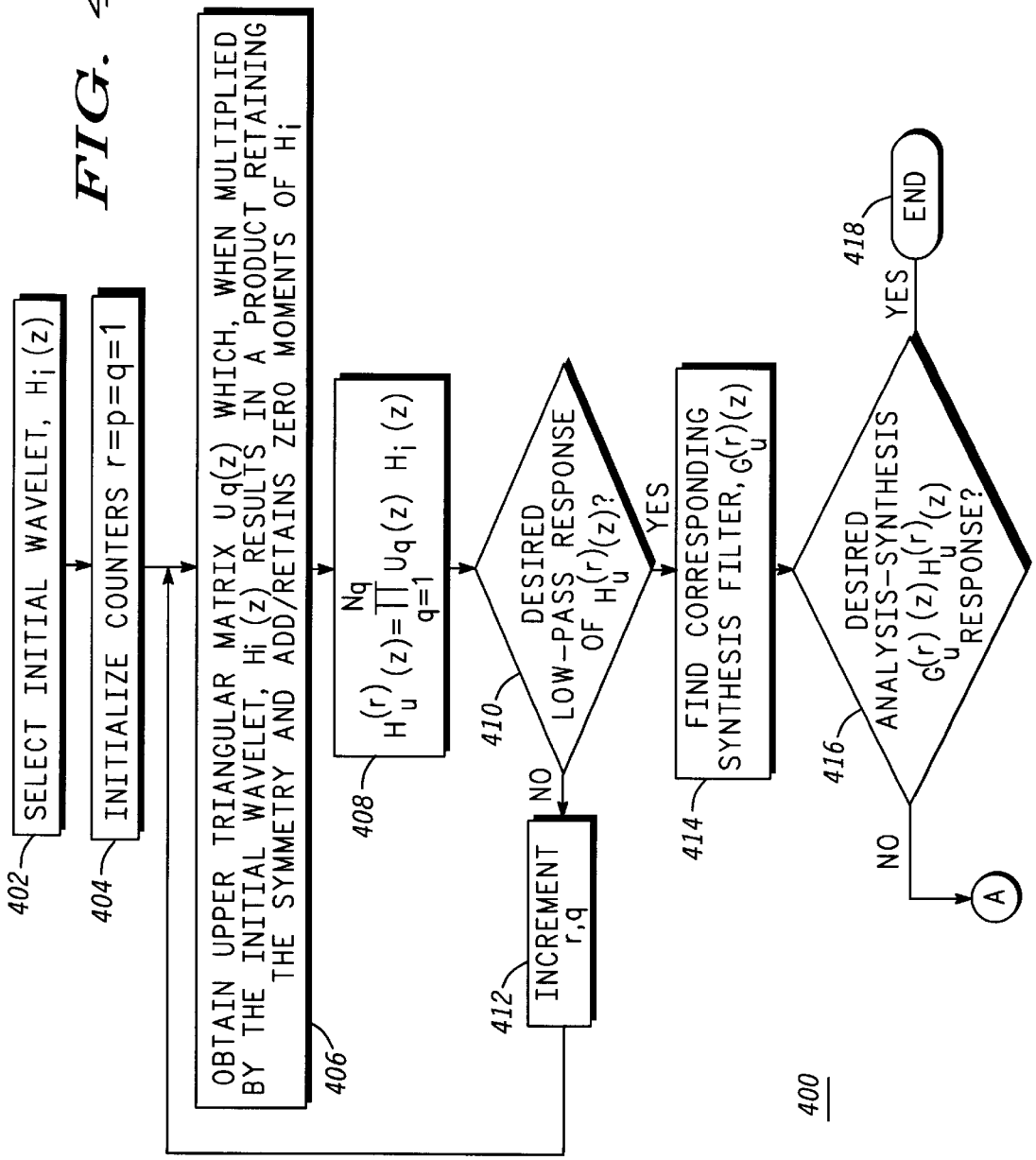
FIGS. 4a–4c are flow charts representing a method of a wavelet filter generation technique in accordance a second embodiment of the invention.
Figure 4B:
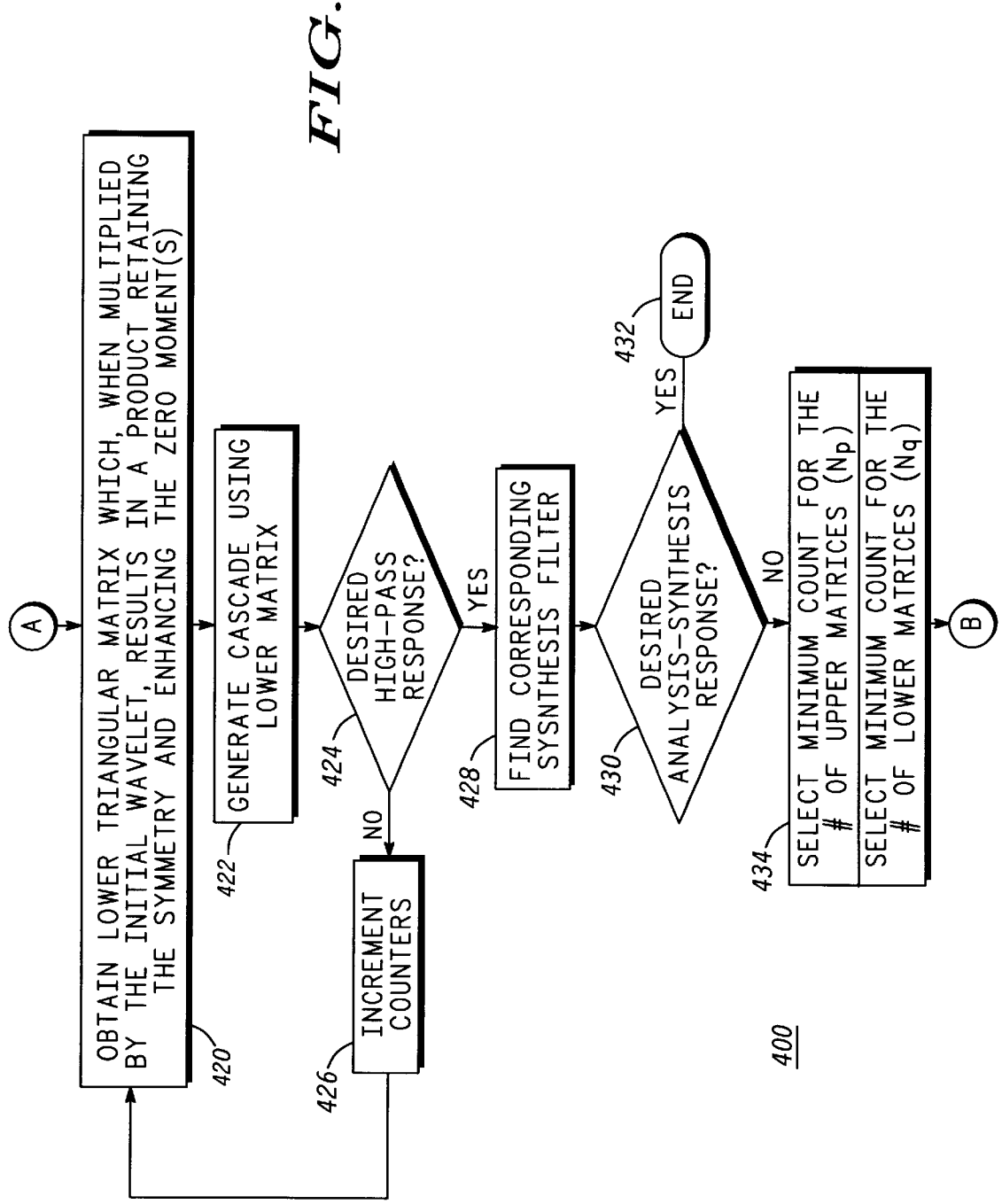
Figure 4C:
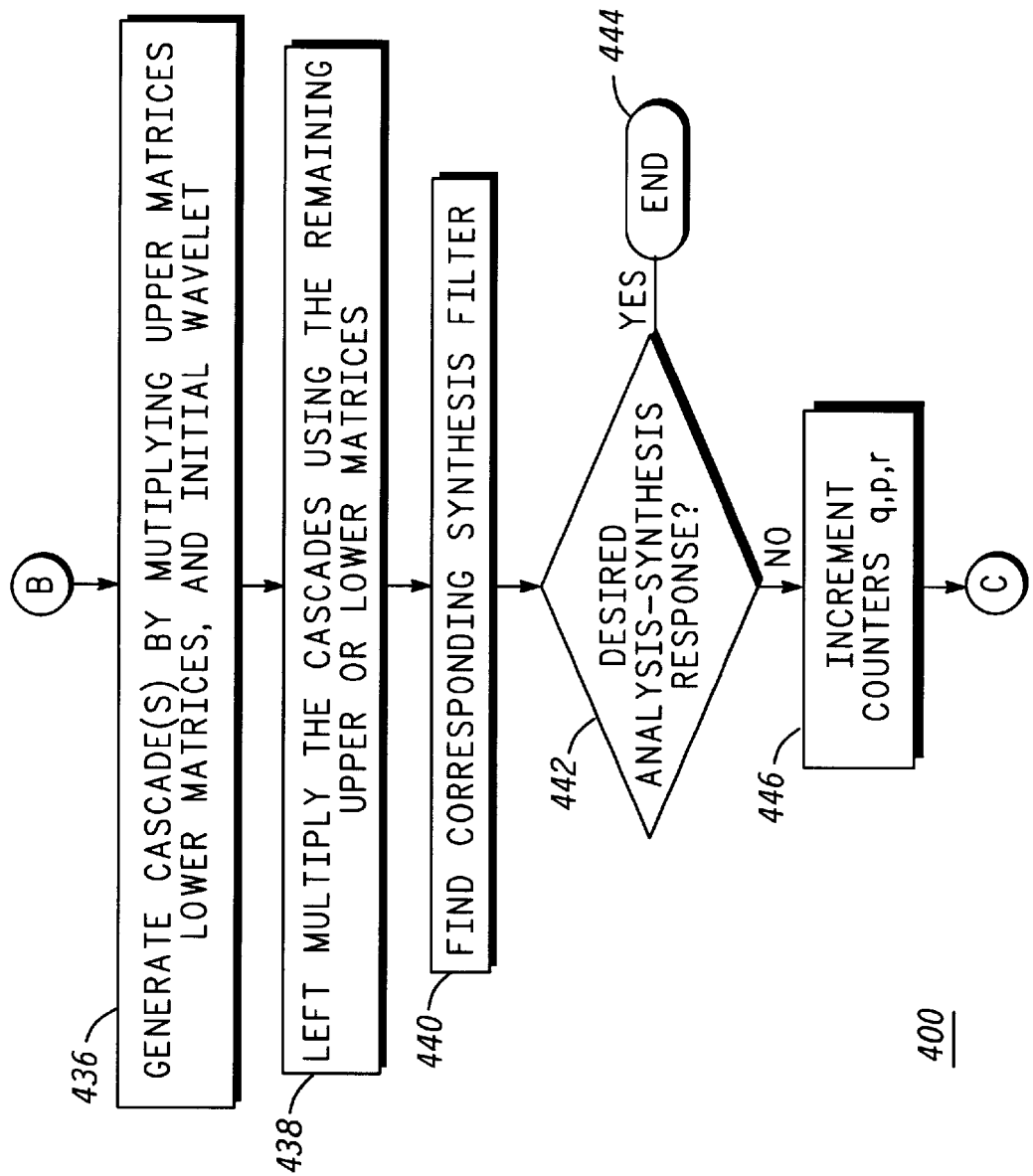

The wavelet filter generation technique 300 is described in terms of the quantity of upper and lower triangular matrices remaining the same (i.e p=q). There are applications however, in which it may be desirable to generate cascades using a greater or lesser number of a particular type of triangular matrices. FIG. 4, is a flow chart depicting a wavelet filter generation technique 400 in accordance with a second embodiment of the invention. Technique 400 begins at step 402 with the selection of an initial wavelet, Hi(z). A set of counters is initialized at step 404. At step 406, an upper triangular matrix is generated, $U_q(z)$, which when multiplied by the initial wavelet, Hi(z) results in a product retaining the symmetry and either retaining or adding zero moments of the initial wavelet. At step 408, a cascade filter is generated by taking the product of the upper triangular matrix and the initial wavelet. Step 410 determines whether the cascade filter has a desired low pass response. If the desired response is not obtained, the counters for the upper triangular matrices are incremented at step 412 and returns to step 406. Thus, steps 406–412 are repeated until a cascade of upper triangular matrices and initial wavelet produce a desired response. Once step 410 is satisfied, the corresponding synthesis filter is found at step 414. The entire analysis-synthesis filter is then compared to a predetermined desired response at step 416, and if the desired response is obtained the process ends at step 418.

If, however, the desired analysis-synthesis filter response has not been generated, the process continues on to step 420, where a lower triangular matrix is obtained. Once again, this lower triangular matrix is selected so a resulting product with the initial wavelet retains symmetry and enhances zero moments at step 420. Another analysis cascade filter is then obtained at step 422 by taking the product of the lower triangular matrix with the initial wavelet. The product is compared to a predetermined response at step 424, and if the desired response is not achieved the counters for the lower triangular matrix are incremented at step 426 and the process returns to step 420. Steps 420–426 are repeated until a cascade filter is generated which produces the desired high pass response. Once the desired high pass response is achieved at step 424, the corresponding synthesis filter is found at step 428. The entire analysis-synthesis filter is then compared to a predetermined desired response at step 430, and if the desired response is obtained, the process ends at step 432.

If the desired response is not obtained at step 430, then a minimum count is selected for the number of upper and lower triangular matrices at step 434. The values of Np and $N_q$ can be adaptively selected by verifying the analysis filter response every time the values of p and/or q are incremented. Cascade filters are generated at step 436 using the combination of upper, lower triangular matrices and initial wavelet. Any additional upper or lower matrices are left-multiplied with the cascade at step 438. Thus, for example, the cascade can be a product of LLLL(ULULULHi) or UU(LULUHi). The corresponding synthesis filter is found at step 440. The desired analysis-synthesis response is checked at step 442, and if the response is satisfactory the process ends at step 444. If the desired analysis-filter response is still not met at step 442, the counters are incremented at step 446, and the process returns to step 406.

The method 400 can alternatively swap the order of the steps determining the upper (406–414) and lower (420–430) triangular matrices. The process 400 thus provides an updated analysis-synthesis filter response by first attempting to create an analysis cascade filter using a first type of triangular matrix (e.g. upper) and then moving on to a second type of triangular matrix (e.g. lower), and then finally attempting pairs of upper/lower or lower/upper triangular matrices. Thus, a more symmetrical filter response is achieved with either upper, lower, or pairs of upper and lower triangular matrices cascaded with an initial wavelet. Again, the final analysis-synthesis filter of the present invention is characterized by an analysis filter bank formed of at least one triangular matrix with coefficients of +/−1 divided by some powers-of-two integer.

Figure 2:
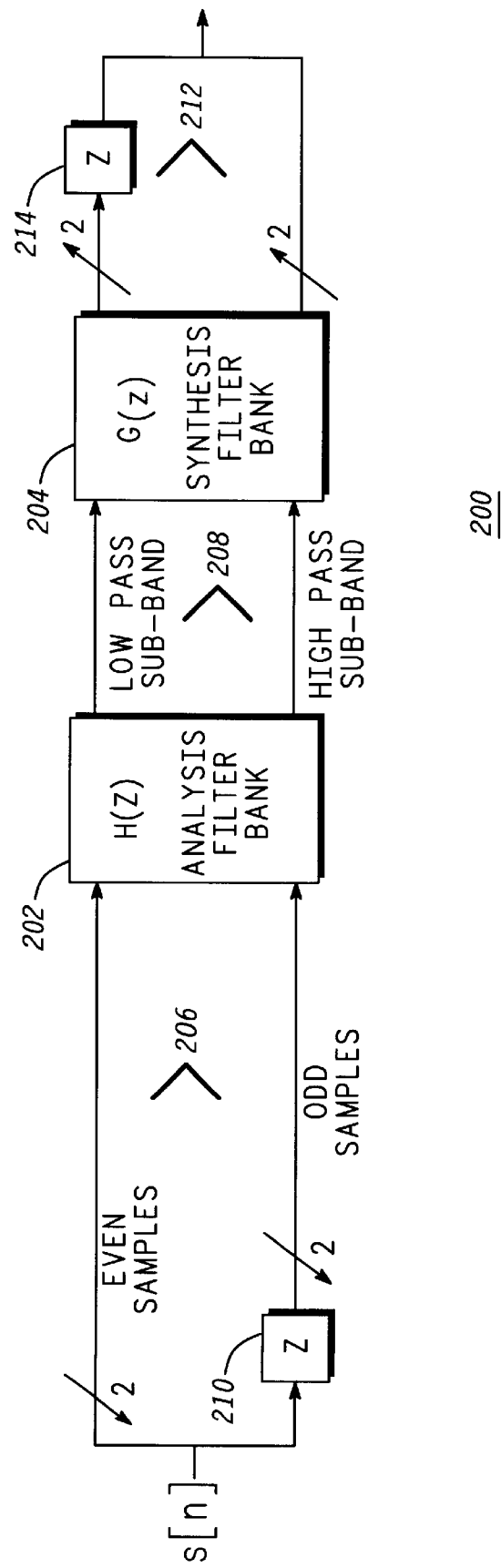
FIG. 2 is a block diagram of a two-channel filter bank whose analysis and synthesis filters are represented in polyphase form
Figure 5:
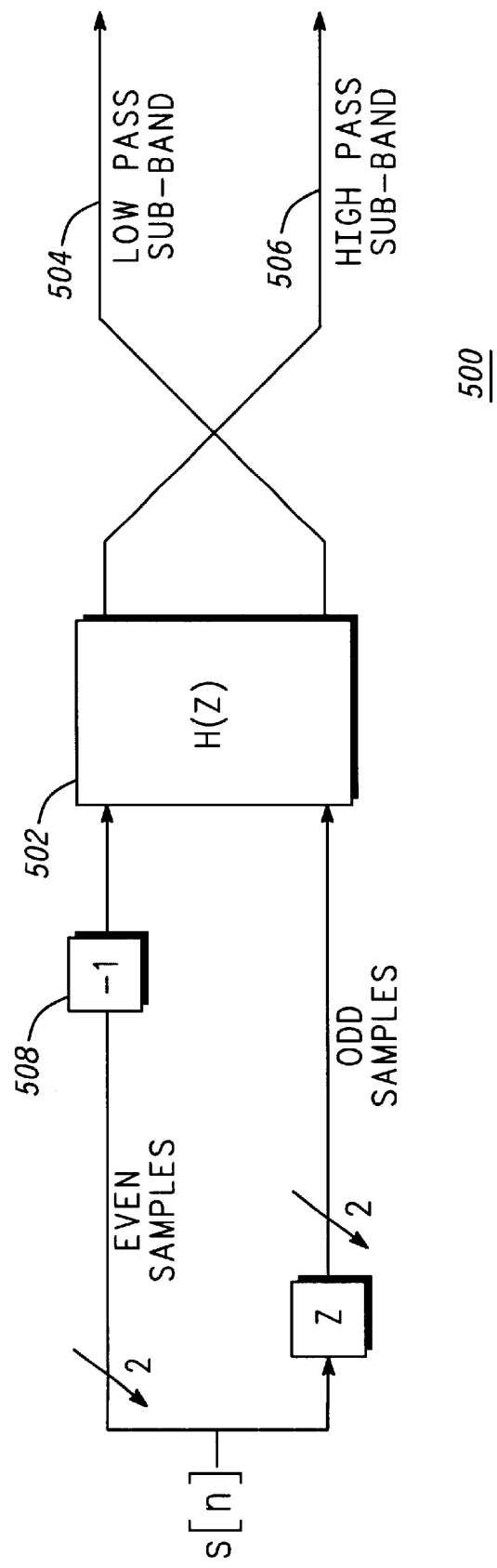
FIGS. 5 and 6 are block diagrams showing a dual mode digital data system implementing filters generated according to either the first or second embodiment of the invention.
Figure 6:
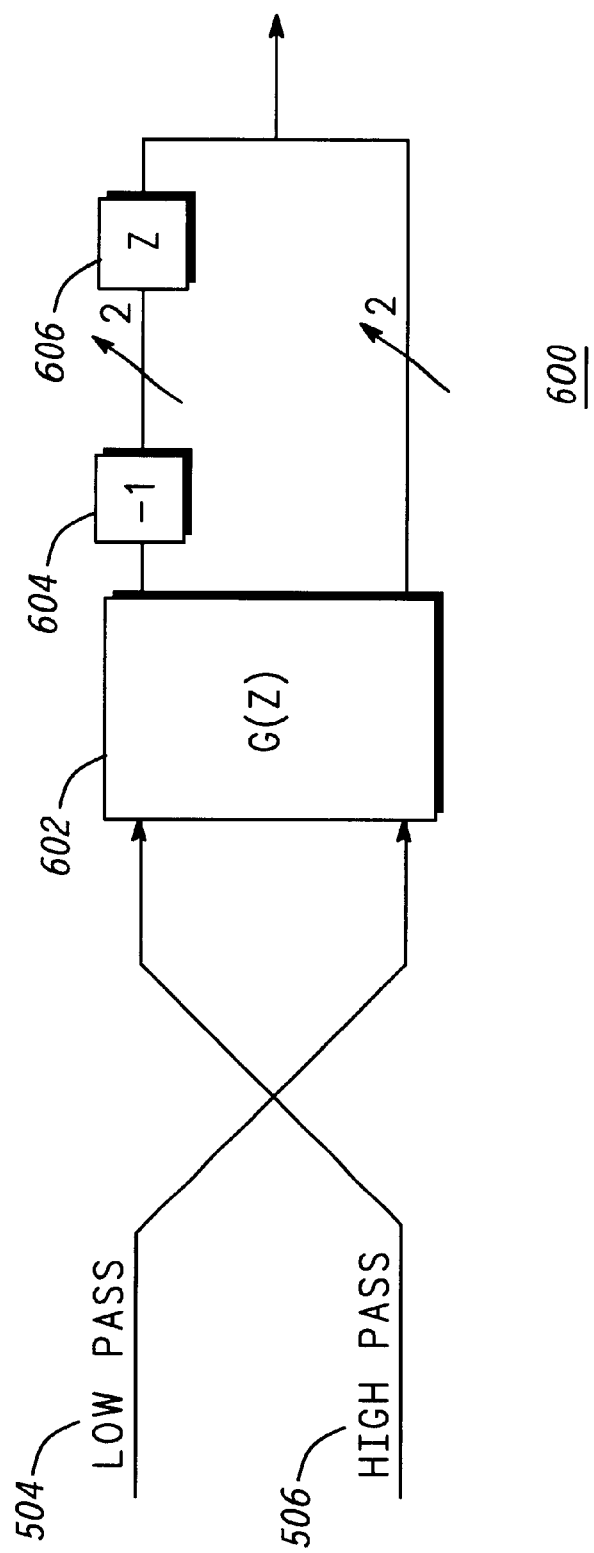

The methods of wavelet filter generation described by techniques 300/400 of the present invention can be extended into a variety of applications, such as duality, odd length filter pairs and even length filter pairs. Once the final modified wavelet is obtained (by either approach 300 or 400) this updated wavelet can be used in a variety of applications. FIGS. 5 and 6 show an updated polyphase wavelet filter consisting of analysis bank, H(z), 502 and synthesis bank, G(z), 602 being applied in a dual mode digital application in accordance with the present invention. Comparing FIGS. 5 and 6 with FIG. 2, it can be observed that, the duality process of the present invention involves just a sign change of the even samples 508 entering the optimized analysis bank 502 and a functional interchange between the low pass and high pass sub-bands 504, 506 after processing through the analysis polyphase matrix H(z)502. At the input of the synthesis filter bank 602, the interchanged outputs from the optimized analysis filter bank 502 still holds. In addition, after processing through the polyphase synthesis bank 602, there is a sign change 604 and a delay operator 606 at the low pass output.

Just as the product of the polyphase matrices H(z)G(z) (from steps 300/400)is a delay multiplying the identity matrix, so is the product of the dual polyphase matrices Hd(z) and Gd(z). The dual synthesis offers several features. By using sign change operators, delay operators, and interchanged inputs, new sets of wavelet filters are created with few computations through the dual mode implementation of the present invention.

In accordance with the invention, for the odd length filter case, a more general solution starting with the 3/1 as the initial wavelet, $H_f(z)$ is given by $$H(z) = \begin{bmatrix} 1 & 0 \\ \alpha(1+z)^{2n-1} & z^n \end{bmatrix} \begin{bmatrix} (1+z) & 2 \\ -1 & 0 \end{bmatrix}$$

where $\alpha = \frac{1}{2}^{(2n+1)}$ and n=1,2,3, . . .

Further, in accordance with the present invention, applying an upper triangular matrix, a new wavelet is obtained having the general form, $$H(z) = \begin{bmatrix} z^k & \beta(1+z)(1-z)^{2m} \\ 0 & 1 \end{bmatrix} \begin{bmatrix} (1+z) & 2 \\ \alpha(1+z)^{2n} - z^n & 2\alpha(1+z)^{2n-1} \end{bmatrix}$$

where k=n+m, n=1,2,3, . . . and m=1,2,3, . . . and β=1/(8α)

The following Table provides a list of examples of very practical filter pairs and their associated polyphase matrices that have been generated using the wavelet generation techniques 300, 400 of the present invention. As seen in the Table, the cascade of matrices include triangular matrices formed of integer coefficients of +/−1, powers-of-two, divided by some powers-of-two integer. These analysis cascade filters provide for simplified computations by performing simple shifts and additions.

| Filter length | Polyphase Matrix |
|---|---|
| 3/1 | $H = \begin{bmatrix} \frac{(1+z)}{2} & 1 \\ -1 & 0 \end{bmatrix}$ |
| 3/5 | $H = \begin{bmatrix} 1 & 0 \\ \frac{(1+z)}{4} & z \end{bmatrix} \begin{bmatrix} \frac{(1+z)}{2} & 1 \\ -1 & 0 \end{bmatrix}$ |
| 7/9 | $H = \begin{bmatrix} 1 & 0 \\ \frac{(1+z)}{4} & 1 \end{bmatrix} \begin{bmatrix} z & \frac{(1-z-z^2+z^3)}{16} \\ 0 & z^2 \end{bmatrix} \begin{bmatrix} \frac{(1+z)}{2} & 1 \\ -1 & 0 \end{bmatrix}$ |
| 7/13 | $H = \begin{bmatrix} 1 & 0 \\ \frac{-1+z-z^2-z^3}{32} & z \end{bmatrix} \begin{bmatrix} 1 & 0 \\ \frac{(1+z)}{4} & 1 \end{bmatrix} \begin{bmatrix} z & \frac{(1-z-z^2+z^3)}{16} \\ 0 & z^2 \end{bmatrix} \begin{bmatrix} \frac{(1+z)}{2} & 1 \\ -1 & 0 \end{bmatrix}$ |

-continued

| Filter length | Polyphase Matrix |
|---|---|
| 2/6 | $H = \begin{bmatrix} 1 & 0 \\ \frac{(1-z^2)}{4} & z \end{bmatrix} \begin{bmatrix} \frac{1}{2} & \frac{1}{2} \\ -1 & 1 \end{bmatrix}$ |
| 10/6 | $H = \begin{bmatrix} z^2 & \frac{1}{16}(1-z^2) \\ 0 & 1 \end{bmatrix} \begin{bmatrix} 1 & 0 \\ \frac{(1-z^2)}{4} & z \end{bmatrix} \begin{bmatrix} \frac{1}{2} & \frac{1}{2} \\ -1 & 1 \end{bmatrix}$ |
| 10/18 | $H = \begin{bmatrix} 1 & 0 \\ \left(-\frac{6}{128}\right)(1-2z+2z^3-z^4) & z^3 \end{bmatrix} \begin{bmatrix} z^2 & \frac{1}{16}(1-z^2) \\ 0 & 1 \end{bmatrix} \begin{bmatrix} 1 & 0 \\ \frac{(1-z^2)}{4} & z \end{bmatrix} \begin{bmatrix} \frac{1}{2} & \frac{1}{2} \\ -1 & 1 \end{bmatrix}$ |

Accordingly, there has been provided an apparatus and method of generating improved wavelet filters. Though described in terms of a two-channel system, the filtering technique of the present can be applied to multi-channel systems. Three-dimensional (3-D) systems, such as video, two-dimensional (2-D) systems, such as still images, as well as one-dimensional (1-D) systems, such as speech will all benefit from the improved computational efficiency provided by the filter generation technique of the present invention. The wavelet generation technique of the present invention allows for the creation of longer wavelet filter pairs as a cascade of simpler filters whose integer coefficients are either +1 or −1, powers-of-two, divided by a powers-of-two factor. Thus, simple shifting or addition can be used to create even longer filters. The generation of integer wavelet coefficients also yields faster computations, avoids the propagation of rounding errors, and involves fewer computations.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of improving selectivity in a wavelet filter, comprising the steps of:
   selecting an initial wavelet formed of a low pass analysis filter bank and a high pass analysis filter bank, the initial wavelet being characterized by zero moment(s) and symmetry;
   obtaining an upper triangular matrix which, when multiplied by the initial wavelet, produces a product retaining the symmetry and enhancing the number of zero moments of the initial wavelet;
   obtaining a lower triangular matrix which, when multiplied by the initial wavelet, produces a product retaining the symmetry and enhancing the number of zero moments of the initial wavelet; and
   multiplying the upper and lower triangular matrices with the initial wavelet thereby producing an updated wavelet with improved selectivity.

2. The method of claim 1, wherein the upper triangular matrix is characterized by a determinant that is a delay operator.

3. The method of claim 1, wherein the lower triangular matrix is characterized by a determinant that is a delay operator.

4. The method of claim 1, further comprising the steps of:
   determining if the number of upper and lower triangular matrices meet a predetermined threshold limit(s); and
   when the predetermined threshold limits have not been met: obtaining a new upper triangular matrix which, when multiplied by the updated wavelet, produces a product retaining the symmetry and enhancing the number of zero moments of the initial wavelet;
   obtaining a lower triangular matrix which, when multiplied by the updated wavelet, produces a product retaining the symmetry and enhancing the number of zero moments of the initial wavelet.

5. The method of claim 4, wherein the predetermined threshold limit is selected based on a desired wavelet filter response.

6. The method of claim 4, wherein the predetermined threshold limit is selected based on a desired wavelet length.

7. The method of claim 4, wherein the predetermined threshold limit is based on computational intensity exceeding a predetermined limit.

8. The method of claim 1, wherein the upper triangular matrix includes a polynomial in z that has the general form $b_q(z)=(1-z)^n b'_q(z)$, where n=the number of zero moments added to the initial wavelet and $b'_q(1) \neq 0$.

9. The method of claim 1, wherein the lower triangular matrix includes a polynomial in z that has the general form $a_p(z)=(1-z)^m a'_p(z)$, where m=the number of zero moments added to the initial wavelet and $a'_p(z) \neq 0$.

10. The method of claim 1, wherein the analysis filter wavelet is characterized by the general form:

$$H(z) = \begin{bmatrix} 1 & 0 \\ \alpha(1+z)^{2n-1} & z^n \end{bmatrix} \begin{bmatrix} (1+z) & 2 \\ -1 & 0 \end{bmatrix}$$

where $\alpha = \frac{1}{2}^{(2n+1)}$ and n=1, 2, 3, . . . .

11. The method of claim 1, wherein the analysis filter is characterized by the general form:

$$H(z) = \begin{bmatrix} z^k & \beta(1+z)(1-z)^{2m} \\ 0 & 1 \end{bmatrix} \begin{bmatrix} (1+z) & 2 \\ \alpha(1+z)^{2n} - z^n & 2\alpha(1+z)^{2n-1} \end{bmatrix}$$

where k=n+m, n=1,2,3, . . . and m=1,2,3, . . . and $\beta = 1/(8\alpha)$.

12. The method of claim 1, wherein a 3/1 biorthogonal wavelet is generated using an analysis filter of $$H = \begin{bmatrix} \frac{(1+z)}{2} & 1 \\ -1 & 0 \end{bmatrix}.$$

13. The method of claim 1, wherein a 3/5 biorthogonal wavelet is generated using an analysis filter of $$H = \begin{bmatrix} 1 & 0 \\ \frac{(1+z)}{4} & z \end{bmatrix} \begin{bmatrix} \frac{(1+z)}{2} & 1 \\ -1 & 0 \end{bmatrix}.$$

14. The method of claim 1, wherein a 7/9 biorthogonal wavelet is generated using an analysis filter of $$H = \begin{bmatrix} 1 & 0 \\ \frac{(1+z)}{4} & 1 \end{bmatrix} \begin{bmatrix} z & \frac{(1-z-z^2+z^3)}{16} \\ 0 & z^2 \end{bmatrix} \begin{bmatrix} \frac{(1+z)}{2} & 1 \\ -1 & 0 \end{bmatrix}.$$

15. The method of claim 1, wherein a 7/13 biorthogonal wavelet is generated using an analysis filter of $$H = \begin{bmatrix} 1 & 0 \\ \frac{-1+z-z^2-z^3}{32} & z \end{bmatrix} \begin{bmatrix} 1 & 0 \\ \frac{(1+z)}{4} & 1 \end{bmatrix}$$
$$\begin{bmatrix} z & \frac{(1-z-z^2+z^3)}{16} \\ 0 & z^2 \end{bmatrix} \begin{bmatrix} \frac{(1+z)}{2} & 1 \\ -1 & 0 \end{bmatrix}.$$

16. The method of claim 1, wherein a 2/6 biorthogonal wavelet is generated using an analysis filter of $$H = \begin{bmatrix} 1 & 0 \\ \frac{(1-z^2)}{4} & z \end{bmatrix} \begin{bmatrix} \frac{1}{2} & \frac{1}{2} \\ -1 & 1 \end{bmatrix}.$$

17. The method of claim 1, wherein a 10/6 biorthogonal wavelet is generated using an analysis filter of $$H = \begin{bmatrix} z^2 & \frac{1}{16}(1-z^2) \\ 0 & 1 \end{bmatrix} \begin{bmatrix} 1 & 0 \\ \frac{(1-z^2)}{4} & z \end{bmatrix} \begin{bmatrix} \frac{1}{2} & \frac{1}{2} \\ -1 & 1 \end{bmatrix}.$$

18. The method of claim 1, wherein a 10/18 biorthogonal wavelet is generated using an analysis filter of $$H = \begin{bmatrix} 1 & 0 \\ \left(-\frac{6}{128}\right)(1-2z+2z^3-z^4) & z^3 \end{bmatrix} \begin{bmatrix} z^2 & \frac{1}{16}(1-z^2) \\ 0 & 1 \end{bmatrix}$$
$$\begin{bmatrix} 1 & 0 \\ \frac{(1-z^2)}{4} & z \end{bmatrix} \begin{bmatrix} \frac{1}{2} & \frac{1}{2} \\ -1 & 1 \end{bmatrix}.$$

* * * * *